(12) United States Patent
Morita et al.

(10) Patent No.: US 6,816,981 B2
(45) Date of Patent: Nov. 9, 2004

(54) DISK ARRAY DEVICE INCLUDING A MEMORY WITH BACKUP POWER SUPPLY AND METHOD THEREOF

(75) Inventors: Hirofumi Morita, Yokohama (JP); Takashi Ishida, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 09/783,528

(22) Filed: Feb. 15, 2001

(65) Prior Publication Data

US 2001/0049799 A1 Dec. 6, 2001

(30) Foreign Application Priority Data

Jun. 5, 2000 (JP) .................................... 2000-167484

(51) Int. Cl.[7] .............................................. G06F 11/00
(52) U.S. Cl. ............................. 714/6; 714/14; 711/114
(58) Field of Search ..................... 714/6, 14; 711/114

(56) References Cited

U.S. PATENT DOCUMENTS

| | | | | |
|---|---|---|---|---|
| 5,313,612 A | * | 5/1994 | Satoh et al. ................ | 711/162 |
| 5,533,190 A | * | 7/1996 | Binford et al. .............. | 714/6 |
| 5,596,708 A | * | 1/1997 | Weber ........................... | 714/6 |
| 5,634,033 A | * | 5/1997 | Stewart et al. .............. | 711/114 |
| 5,835,955 A | * | 11/1998 | Dornier et al. ............. | 711/162 |
| 5,889,933 A | * | 3/1999 | Smith .......................... | 714/22 |

* cited by examiner

Primary Examiner—Robert Beausoliel
Assistant Examiner—Emerson Puente
(74) Attorney, Agent, or Firm—Staas & Halsey LLP

(57) ABSTRACT

A disk array device maintains data reliability with few performance degradation problems. In a RAID 4 or RAID 5 disk array device, redundant data created during disk degeneration with a device control module is transferred to a memory of a subsystem control module. The memory is backed up with a battery. The redundant data is held in memory until a writing operation to disk drives is completed. Then, when recovering after a momentary power supply interruption, the write data and parity data stored in the memory are written out without writing data from the disk drive. When recovering after a momentary power supply interruption and the disks are normal, the redundant same-group data is read from disk drives other than those on which the data that is to be written and the parity are stored and based on those and the write data, new redundant data is created and written to the object disk.

21 Claims, 15 Drawing Sheets

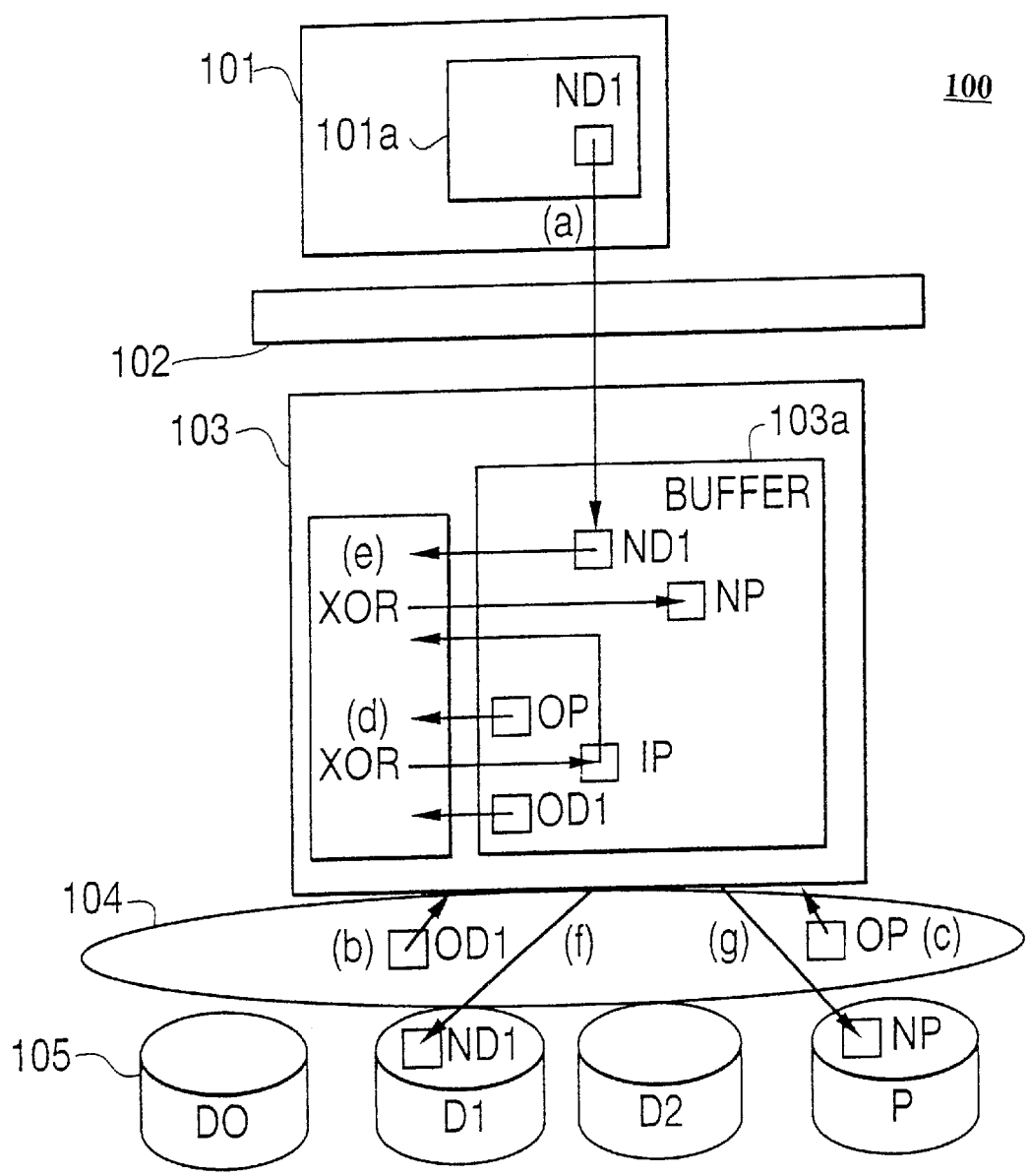

DISK ARRAY DEVICE INCLUDING A MEMORY WITH BACKUP POWER SUPPLY AND METHOD THEREOF

CROSS REFERENCE TO RELATED APPLICATIONS

The contents of 2000-167484, filed Jun. 5, 2000 in Japan, are incorporated herein by reference.

BACKGROUND OF THE INVENTION

1. Field of the Invention

The present invention relates to disk array devices including multiple disk devices equipped with a restorative function used when the disk devices fail.

2. Description of the Related Art

In recent years, devices have been made available in which subsystem components are multiplexed and have a degree of redundancy. A localized trouble-shooting function and the redundant configuration of these devices increases the continuous usability of these devices and allows for the automatic restoration of data when a disk fails. The data redundancy method is categorized into 6 stages ranging from RAID 0 to RAID 5 (RAID is the Redundant Array of Inexpensive Disks).

FIG. 14(a) shows a schematic diagram of a RAID 4 System 100. As shown in FIG. 14(a), RAID 4 employs a parity system for data restoration information. The RAID 4 System 100 shown in FIG. 14(a) includes several data disks D0, D2, . . . storing the data allocated in multiple read/write units, a parity-generating unit P and a disk device DP which stores the parity.

In the RAID 4 System 100 shown in FIG. 14(a), the data is allocated into multiple units designated by A0, A2, . . . . Generally, these data units A0, A2, . . . are fixed lengths. The allocated data A0, A2, . . . are distributed to and stored on the data disks D0, D2, . . . while the parity is stored on the dedicated disk DP. In the following description, the data that is allocated to different disks and stored as above is referred to as redundant identical group data or simply as redundant group data. The disk groups that this data is stored on are referred to as redundant group disks. The parity can also be referred to as redundant data.

When there is a problem with a disk, the data on the disk is regenerated from the remaining identical group data and parity (redundant data).

RAID 4 is capable of reading out multiple data simultaneously but cannot write multiple data at the same time. When updating data, the RAID 4 System 100 always reads the parity and the data before the update and writes after creating the update parity, which requires additional access. This is referred to as a write penalty.

FIG. 14(b) shows a schematic diagram of a RAID 5 System 200. Like the RAID 4 System 100, the RAID 5 System 200 employs a parity system for data restoration information. The RAID 5 System 200 also includes multiple disks D1, D2, . . . for storing parity, and a parity-generating unit P.

In the RAID 5 System 200, the data is divided into several groups as shown in FIG. 14(b), including A0, A1, . . . B0, B1, . . . The groups of divided data are distributed to disks D1, D2, . . . respectively and stored therein. The parity PA, of the data A0, A1 . . . and the parity PB of the data B0, B1 . . . are distributed to the disks D1, D2, D3 . . . and stored.

In the RAID 5 System 200, as with the RAID 4 System 100, when there is a problem with a disk, the data on the disk is regenerated from the aforementioned identical group data and parity (parity data).

RAID 5 is capable of reading and writing multiple disks simultaneously. When updating the data, there is the aforementioned write penalty. Also, while updating the parity, no read/write access is allowed to the disk.

FIG. 15 shows a diagram with an example of the write sequence in a disk array device to which the aforementioned RAID 4 System 100 or RAID 5 System 200 could be applied. The example of the write sequence shown in FIG. 15 corresponds to the RAID 4 System 100 and is explained with reference to the RAID 4 System 100.

As shown in FIG. 15, the RAID 4 System 100 includes a subsystem control module 101, which includes subsystem control module internal memory 101a. Also shown in FIG. 15, the RAID 4 System 100 includes subsystem internal interface module 102 (hereafter, "interface" is abbreviated to I/F), device control module 103, buffer 103a, device I/F module 104, disk group 105, data disks D0~D2, and redundant disk P storing redundant data.

Referring now to FIG. 15, OD (Old Data) is the data that is to be updated (referred to as old data below), OP (Old Parity) is the parity data to be updated (referred to as old parity below), ND (New Data) is the write data, NP (New Parity) is the write redundant data (referred to as new parity below) and IP is the interim parity data.

As shown in FIG. 15, the write operation in the disk array device 100 is carried out as explained herein below. (Items (a)~(g) in FIG. 15 correspond, respectively, to items (a)~(g) below.)

(a) The write data ND1 is transferred from the memory 101a of the subsystem control module 101 to the buffer 103a of the device control module 103.

(b) The data OD1 on the disk that is to be written to is read into the buffer 103a.

(c) The redundant data OP of the redundant group of the data to be written is read into the buffer 103a.

(d) The interim redundant data IP is generated by performing an exclusive "or" operation on OD1 and OP.

(e) The new redundant data NP is generated by performing an exclusive "or" operation on ND1 and IP.

(f) ND1 is written to the disk 105.

(g) NP is written to the disk 105.

For this sequence, items (a)~(c) and (e)~(f) do not have to be performed in any strictly fixed order.

The following types of methods are possible for maintaining the reliability of the data when there has been a momentary interruption due to a power outage or other reason in systems that perform the above sort of write operation:

(1) Continuous subsystem operation by means of a battery back-up system for the entire device.

(2) Write data support based on non-volatile memory.

In (1) above, when the power supply supplied to the device is cut off, the data is secured by the continuous operation of a subsystem. However, in (1) above, a large-capacity battery is required to back up the entire subsystem and in actual installations, the percent that this occupies is extremely large.

In (2) above, the write data remains in memory which nearly always makes recovery possible by writing to the disk again when the power supply is turned back on. Also in (2) above, if the write was being carried out before power supply was cut off and the redundant data was being written, that RAID would be in degeneration mode (at least when one disk had failed). Then when the power supply was turned on again, when the RAID shifted into degeneration mode, the redundancy of that redundant group would be lost and it would not be possible (since it would not be performed properly) to restore the data on the broken disk or to write the data of that redundant group. This state is referred to as a "Write Hole".

To correct this sort of problem, the redundant data stored in the memory 101a is managed constantly and the status of the write progress is written to the memory 101a. That progress status is used with the redundant data to perform the recovery. Avoiding the above state has also been considered, but the need to constantly transfer redundant data while writing led to a drop in performance.

SUMMARY OF THE INVENTION

The present invention solves the above-mentioned problems.

An object of the present invention is to provide a disk array device that maintains reliability of data without too great a loss of performance, even in degeneration mode, as well as when the power supply is turned back on after being turned off.

The present invention comprises a disk array device including a subsystem control module, disk, and a device control module. The subsystem control module comprises a memory backed up with a battery. The disks store data and/or parity. The device control module controls the disks. The device control module comprises a buffer storing redundant data, wherein when data is to be written to the disks, the disk array device allocates and writes the data to the respective disks, generates redundant data from the allocated data, and writes the redundant data onto disks of the disks not storing the allocated data, and wherein when writing data to the disks, the data written to the memory of the subsystem control module is held until a writing process is completed and when at least one of the disks is broken or degenerated, the disk array device transfers and stores the redundant data stored in the buffer of the device control module to the memory of the subsystem control module.

Further, the present invention comprises a disk array device coupled to and receiving data from a host computer. The disk array device of the present invention comprises a subsystem control module and a device control module. The subsystem control module of the present invention comprises a memory having a backup power supply. The memory stores data redundant to the data received from the host computer. The device control module of the present invention is in communication with the subsystem control module. The device control module interfaces to and controls access of a disk drive group storing data and parity on disk drives. The memory of the subsystem control module stores the redundant data until the device control module notifies the subsystem control module that the device control module has successfully written the data received from the host computer to the disk drive group.

In addition, the present invention comprises a method a disk array device controlling disks storing data and coupled to a host computer. The method of the present invention comprises storing data redundant to data received from the host computer, in a memory, having a backup power supply, of the disk array device until the data received from the host computer is successfully written to the disks by the disk array device.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 15 is a diagram showing a typical write operation sequence in a disk array device of the related art.

DESCRIPTION OF THE PREFERRED EMBODIMENTS

Figure 1:
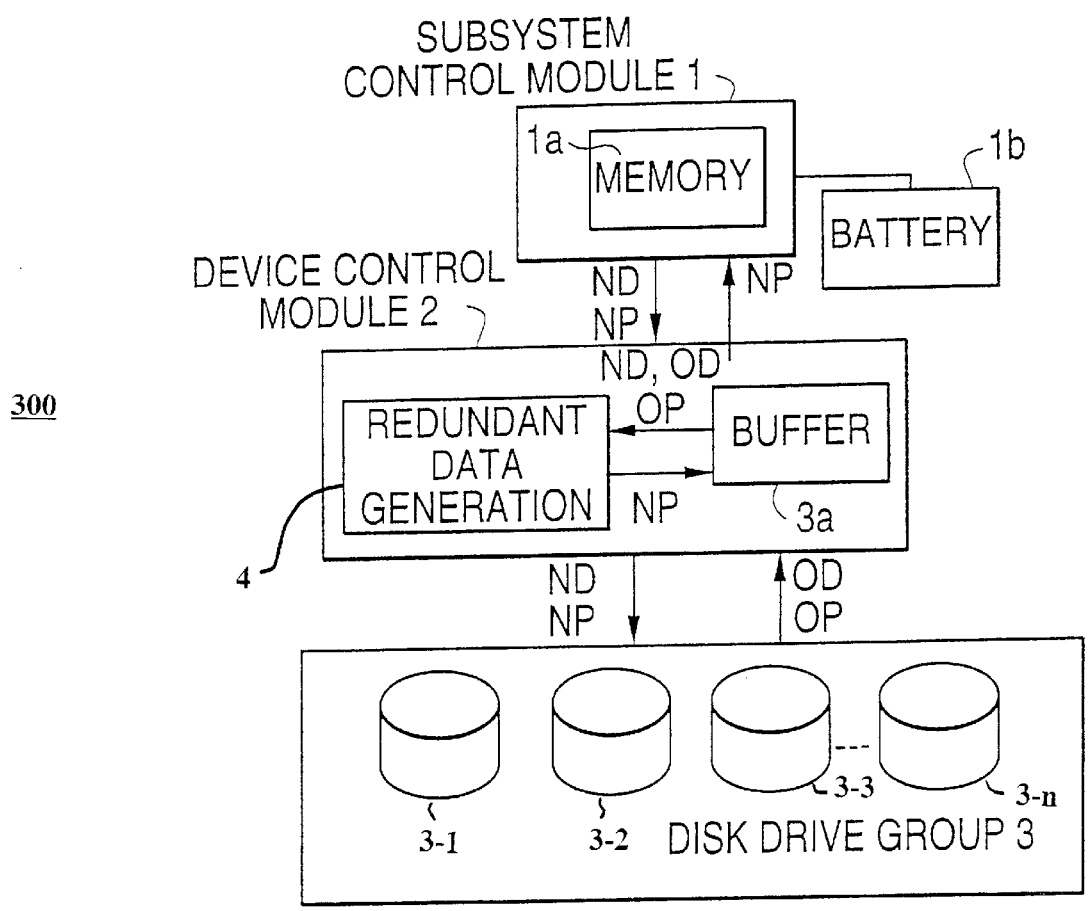
FIG. 1 is a schematic diagram showing a disk array device control unit of the present invention.

FIG. 1 is a schematic diagram of a disk array device control unit 300 of the present invention. As shown in FIG. 1, the disk array device control unit 300 of the present invention comprises subsystem control module 1 (in which memory 1a is backed up at least by a backup power supply such as battery 1b), device control module 2, and disk drive group 3. Disk drive group 3 comprises several disks 3-1, 3-2, 3-3, 3-4, . . . Device control module 2 controls the disks 3-1, 3-2, 3-3 . . . , 3-n More particularly, device control module 2 allocates and writes write data to some of the aforementioned disks 3-1, 3-2, 3-3, . . . , 3-n, and generates redundant data from the allocated data. That is, device control module includes buffer 3a and redundant data generation unit 4.

In disk array device control unit 300 of the present invention, the following modes are set up on the aforementioned RAID 4 and RAID 5 disk array devices, which write the redundant data to disks other than disks storing the allocated data. The disk array device control unit 300 of the present invention operates in different modes corresponding to specific states when writing data. These states include the aforementioned normal state, the disk degeneration state, and the recovery state after the power supply has been cut off.

(1) During the normal state, the new redundant data NP is generated from the data OD to be updated, the redundant data OP to be updated and the write data ND. The write data ND and the new redundant data NP are written to the object disk.

(2) During disk degeneration when the data is written, the redundant data NP created by the device control module 2 is transferred to the memory 1a of the subsystem control module 1 which undergoes a battery back-up. Then, the redundant data NP is held in memory 1a until the write is finished.

(3) When rewriting the data after the power supply has been cut off momentarily, the data OD in the redundant same-group is read from the disk drives other than those disk drives on which the object data and parity are stored, and using those and the write data ND in memory 1a, the new redundant data NP is created. The write data ND and the new redundant data NP are then written to the object disk.

(4) When rewriting after the power supply has been turned off momentarily during disk degeneration, no data is read in from the disk drive and the write-out is performed using the parity data NP and the write data ND in memory 1a that was backed up using a battery 1b.

As explained herein above, in degeneration mode, the disk array device control unit 300 of the present invention transfers the redundant data NP to the memory 1a, which has been backed up using the battery (or power supply) 1b so even when rewriting after a momentary suspension of power in degeneration mode, the data can be written out correctly. For this reason, in the disk array control unit 300 of the present invention, there is no need to transfer the redundant data NP to memory constantly, and this holds performance losses to a minimum and maintains a high degree of reliability.

Figure 2:
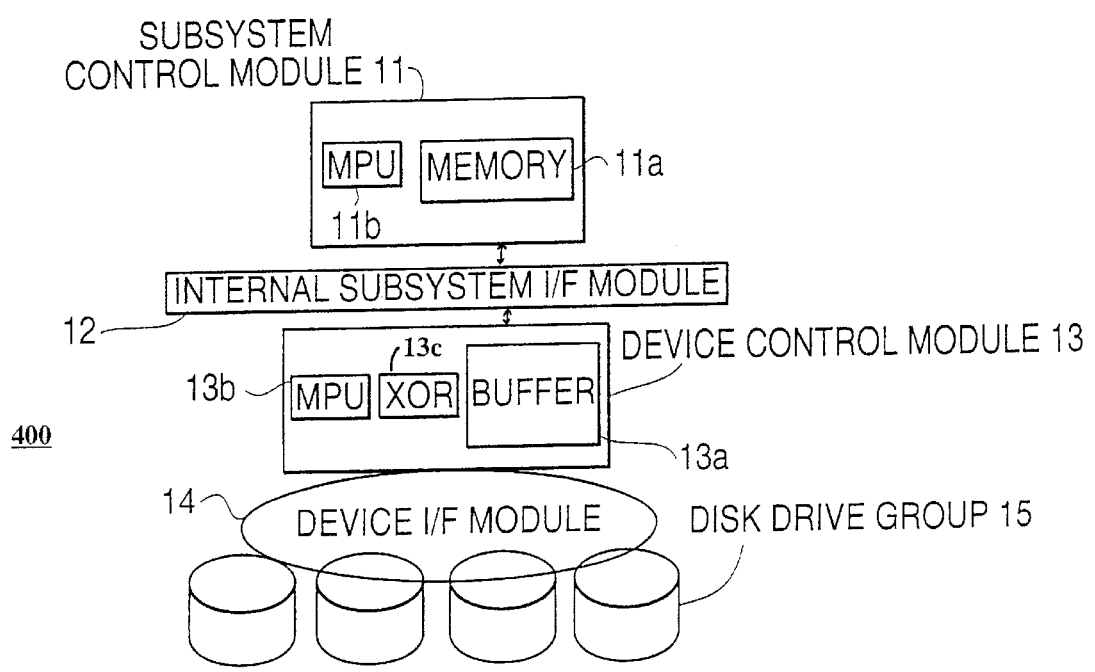
FIG. 2 is a diagram showing a typical schematic configuration of a disk array device in which the present invention could be used.

FIG. 2 shows a schematic example of a disk array device 400 in which the functions of the disk array device control unit 300 of the present invention are included. FIG. 2 shows a configuration using a large-scale disk array device 400 and includes a subsystem control module 11, an MPU 11b, memory 11a, internal subsystem interface (I/F) module 12, device control module 13, device interface (I/F) module 14, and disk drive group 15. Internal subsystem I/F module 12 is an internal I/F for the purpose of connecting the aforementioned subsystem control module 11 with other control modules and the device control module 13, which has several processors connected to it.

The device control module 13 follows the instructions of the aforementioned subsystem control module 11 and is the control module that controls the disk drive group 15. The device control module 13 also includes buffer 13a, MPU 13b (which controls the device I/F module 14), and the function 13c performing an exclusive "or" (which also can be written as XOR or EOR) operation needed for RAID 4 and RAID 5 operations.

Device I/F module 14 connects the device control module 13 with the disk drive group 15. In the disk array device 400 shown in FIG. 2, a serial I/F image is used, but a parallel I/F could also be used. Disk drive group 15 stores the data.

Figure 3:
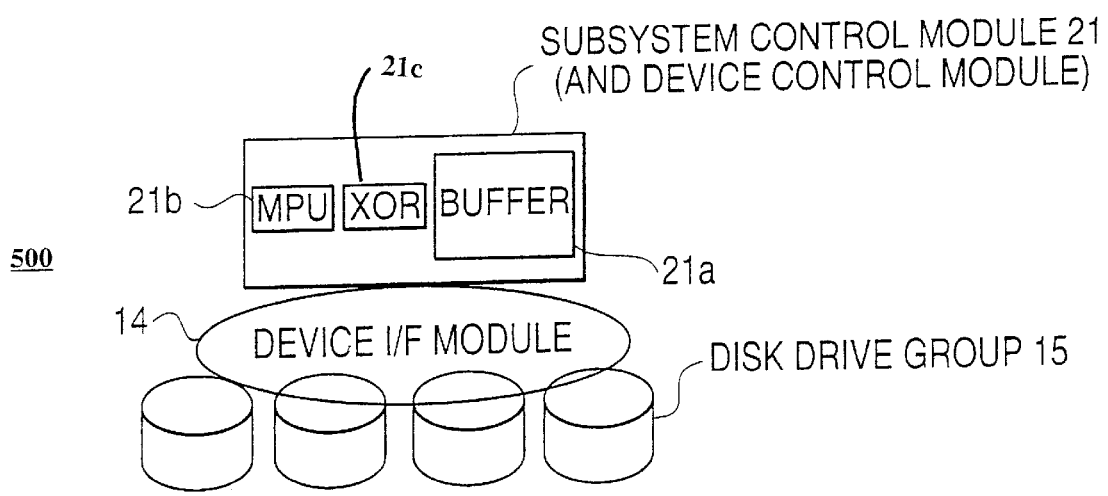
FIG. 3 is a diagram showing another typical schematic configuration of a disk array device in which the present invention could be used.

FIG. 3 shows a configuration used in a small-scale disk array subsystem 500. The functions of the disk array device control unit 300 of the present invention are included in the small-scale disk array subsystem 500 shown in FIG. 3.

Subsystem control module 21 controls the small-scale disk array subsystem 500. The functions of the device control module 13 shown in FIG. 2 are included in the subsystem control module 21. In addition to the aforementioned memory, the subsystem control module 21 includes buffer 21a, the chip bus control unit (MPU) 21b, and the XOR operation 21c.

Device I/F module 14 and disk drive group 15 shown in FIG. 3 correspond, respectively, to the device I/F module 14 and the disk drive group 15 shown in FIG. 2.

Figure 4:
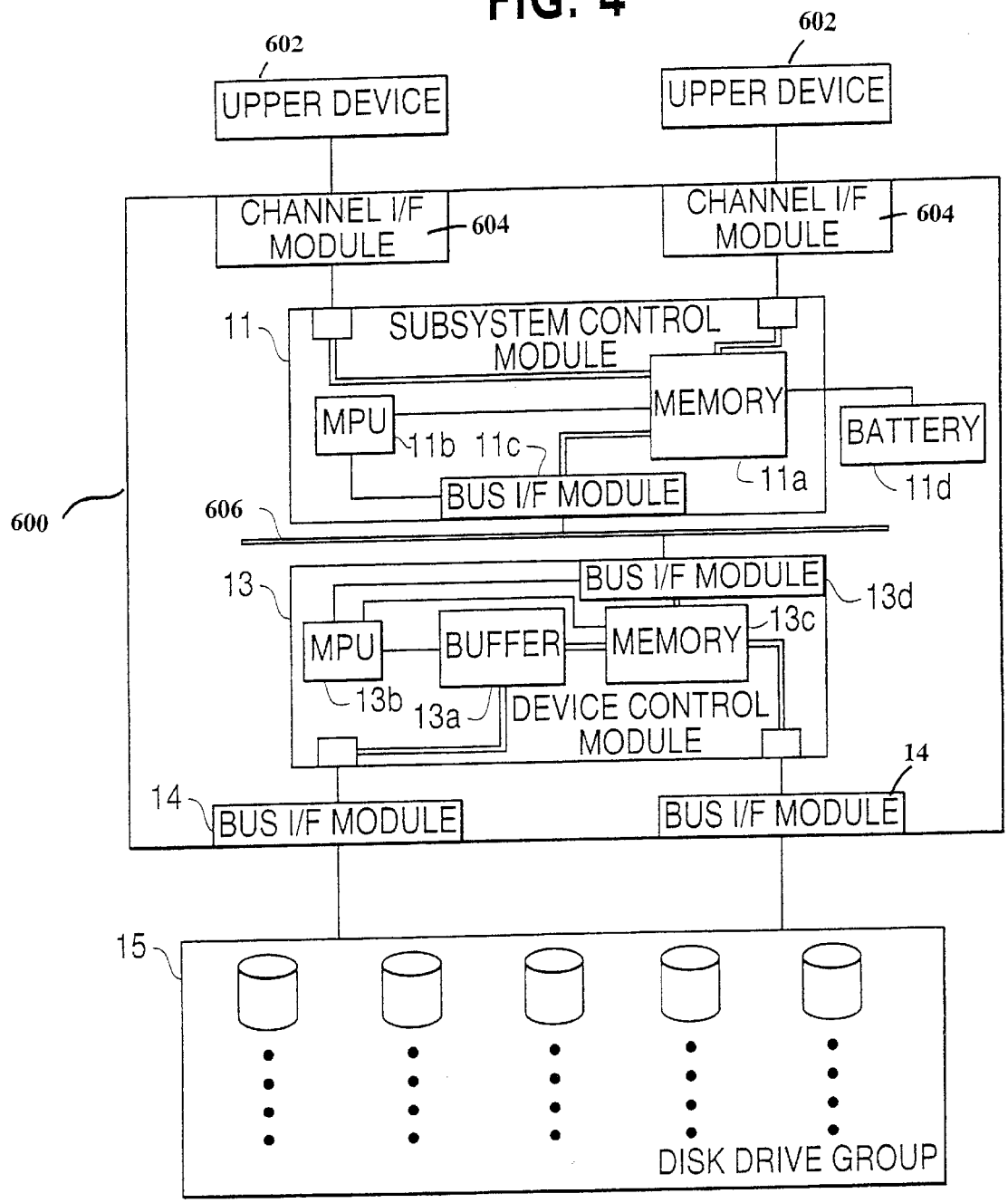
FIG. 4 is a diagram showing a hardware configuration of the embodiment of the present invention.

FIG. 4 shows a hardware configuration example of a disk array device 600 corresponding to the disk array device 400 shown in FIG. 2.

Referring now to FIG. 4, subsystem control module 11 is connected to the upper device 602 through the channel I/F module 604. The subsystem control module 11 comprises memory 11a, MPU 11b and the bus I/F module 11c. The aforementioned MPU 11b operates according to a program stored in the memory 11a. In addition to the program, the memory 11a also stores transfer data and control data. In the aforementioned subsystem control module 11, at least the memory 11a is backed up using the battery 11d and holds the stored data during a momentary loss of power. Even when the memory 11a is backed up, memory 11a cannot retain data during a loss of power for an extended period of time, so disk array device 600 can be configured so that a special disk drive not shown in FIG. 4 could be backed up by a battery and when there is a loss of power, the user data and the control information in the memory 11a (including the redundant data) could be written to the aforementioned disk drive and then reassembled on the memory 11a after the power had been restored.

Device control module 13 comprises buffer 13a, MPU 13b, memory 13c, and bus I/F module 13d. Memory 13c stores the programs for operation, and 13d, the bus I/F module. The aforementioned XOR operation could be performed using MPU 13b above.

The aforementioned subsystem control module 11 and the device control module 13 are connected by bus 606. The subsystem internal I/F module 12 shown in the aforementioned FIG. 2 corresponds to the aforementioned bus 606, the bus I/F module 11c, and the bus I/F module 13d.

The device control module 13 is coupled to the disk drive group 15 through the device I/F module 14 as stated above.

Next, the operation of the disk array device 600 of the present invention shown in FIG. 4 is described with reference to the disk array device 400 shown in FIG. 2 using the aforementioned RAID 4 and RAID 5 configurations. Although the following description is presented using the RAID 4 configuration, the same method is applicable to the RAID 5 configuration. In addition, in the following embodiments, the disk array device 400 shown in FIG. 2 is described, but the present invention is applicable to the disk array device 500 shown in FIG. 3 in the same way.

In FIG. 2 and FIG. 4, the subsystem control module 11 of this embodiment manages separately the RAID states: normal/degeneration/data loss (when the data on two disks for the same group cannot be read or is not reliable), that make up the disk drive group 15. The subsystem control module 11 refers to these states when executing write commands to the disk drive group 15.

Moreover, when the subsystem control module 11 issues write instructions to the device control module 13, the following modes can be specified and the device control module 13 is capable of executing them:

(1) Mode 1

The data to be updated (OD) and the redundant data to be updated (OP) are read and the interim redundant data IP is taken using an exclusive "or". The write redundant data NP is generated and NP and ND are written to the object disk. For operations selected under normal conditions, this Mode 1 is as described in the aforementioned FIG. 15.

(2) Mode 2

When the device control module 13 creates NP, NP is transferred to the memory 11a of the subsystem control module 11 and, after the transfer, NP is written to the object disk. Mode 2 is selected when writing when the disk is in a state of degeneration described below.

(3) Mode 3

Without reading the OD or OP from disk, data is read from the same address as the above OD on a different disk within the redundant same-group. NP is generated using them and the ND in memory and is then written to the object disk. As described below, Mode 3 is selected for rewriting when there is unwritten data in the memory 11a of the subsystem control module 11 following the restoration of power when there has been an unexpected loss of power while writing and the disk is not in a degeneration state.

(4) Mode 4

Without reading the OD or OP from disk, the NP and ND in memory are written to the object disk. Mode 4 is selected for rewriting when there is unwritten data in the memory 11a of the subsystem control module 11 following the restoration of power when there has been an unexpected loss of power while writing and the disk is in a degeneration state as described below.

The above-mentioned modes are switched in the following manner.

When a disk fails and the subsystem control module 11 receives a malfunction end notice from the device control module 13 and the subsystem control module 11 is unable to access the specified disk and cannot continue operating, this state is recognized as a degeneration state and when writing, the mode is switched from normal mode to degeneration mode.

If the subsystem control module 11 recognizes a device power outage without determining a response from the device control module 13 in response to a subsystem control module 11 write command, then the subsystem control module 11 will determine that the write process is underway. Then, when the power is turned back on, if there is unwritten data remaining in the memory 11a, the write will be performed in the aforementioned Mode 3 (Disk Normal) and Mode 4 (Disk Degeneration).

Generally, the subsystem control module 11 instructs the device control module 13 to shift between modes 1, 2, 3, and 4.

Figure 5:
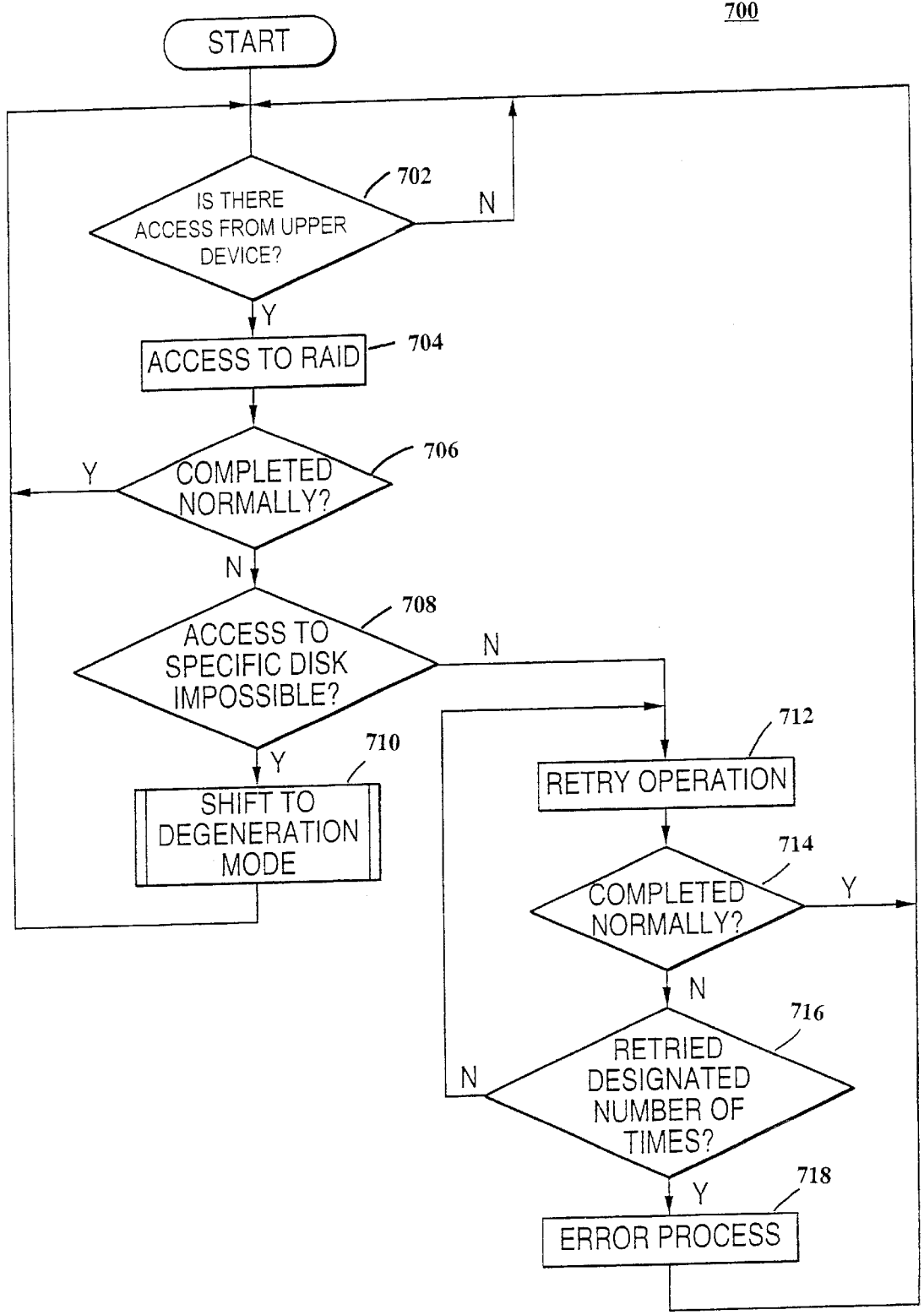
FIG. 5 is a flowchart of the degeneration mode set up process of the present invention.

FIG. 5 shows a flowchart 700 of the shift from the aforementioned normal mode (Mode 1) to degeneration mode (Mode 2) by the subsystem control module 11. The flowchart 700 shown in FIG. 5 is explained with reference to the disk array device 600 shown in FIG. 4 and the subsystem control modules 11 shown in FIGS. 2 and 4.

Referring now to FIG. 5, if there is no access 702 from the upper device 602 to the disk array device 600 (such as requesting access to the RAID), then control returns to process 702. If there is access from the upper device 602 to the disk array device 600, the disk array device 600 (that is, the subsystem control module 11) then attempts to access the RAID (such as disk drive group 15). If the access to the RAID is completed normally 706, the upper device 602 waits for the next RAID access in normal mode. If the access to the RAID is not completed normally, the upper device 602 determines if it is impossible 708 to access the disk in question. If the upper device 602 cannot access the disk in question, the upper device 602 will shift 710 into degeneration mode and control returns to process 702.

If, on the other hand, it is not impossible to access the disk in question, the subsystem control module 11 retries 712 access to the RAID. If access to the RAID is then completed normally 714, the subsystem control module 11 remains in normal mode and waits for the next RAID access 702 from the upper device 602. If the RAID access is not completed normally, the subsystem control module 11 retries a specific number of times 716 and runs 718 an error process after the subsystem control module 11 has retried access the specific number of times.

Next, the disk array system operation of this embodiment of the present invention is described:

(1) Normal Operation

When the RAID (that is, disk drive group 15) in question is in a normal state, the subsystem control module 11 issues instructions for a write operation in "Mode 1" in response to the device operation. This operation is the same as the one described in FIG. 15.

Figure 6:
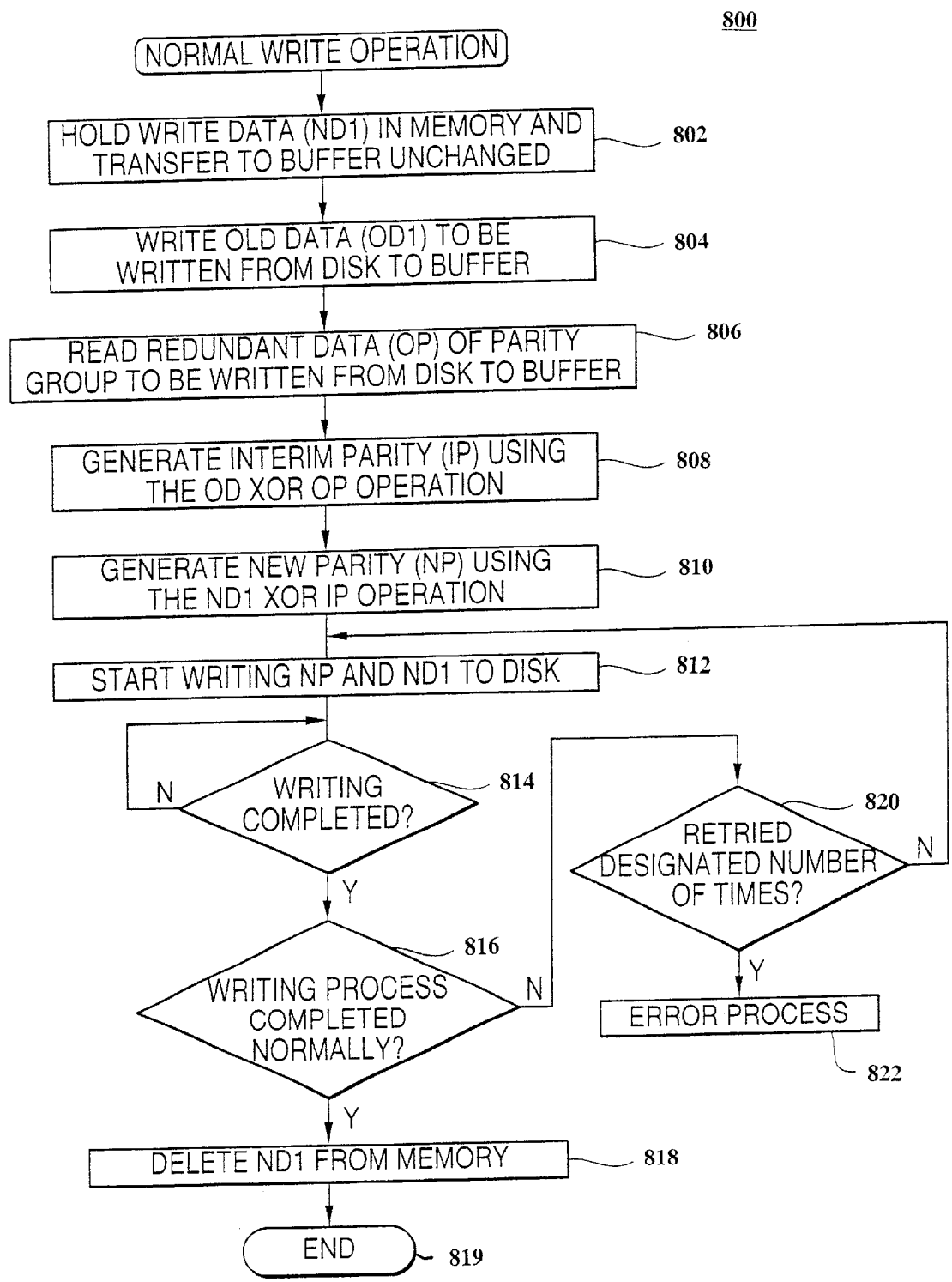
FIG. 6 is a flowchart of a write operation under normal circumstances.

FIG. 6 shows a flowchart 800 of a normal write operation during normal mode. As shown in FIG. 6, ND1, the write data, is first held in the memory 11a and then transferred to buffer 13a (Process 802).

Next, the old data that is to be written (the data to be updated) OD1 is read into the buffer 13a from the disk 15 (Process 804).

Then, the redundant data to be written (the redundant data to be updated) OP is read into the buffer 13a from the disk 15 (Process 806).

Next, an exclusive "or" operation (XOR) is performed on OD1 and OP and the interim parity (interim redundant data) IP is created (Process 808). Then, an exclusive "or" operation (XOR) is performed on ND1 and IP and the new parity (write redundant data) NP is created (Process 810).

As above, once the new parity NP has been created, the write data ND1 and the new parity NP start being written to the disk 15 (Process 812).

Next, the disk array device 400 (or 600) of the present invention waits for the writing to end (Process 814). When the write process is completed normally, the ND1 in the memory 11a is deleted (Process 818) and the process 800 is completed 819.

Alternatively, if the writing is not completed normally, there is a shift from Process 816 to Process 820 and the subsystem control module 11 checks 820 to see if the designated number of retries has been reached. If the designated number of retries has not been reached, the subsystem control module 11 returns to Process 812 and tries to write again (using device control module 13). If the process is not completed normally even after the designated number of retries has been reached, an error process will begin (Process 822).

(2) When There is a Failure on One of the Disk Drives in the Disk Drive Group 15 (During Disk Degeneration).

Figure 7:
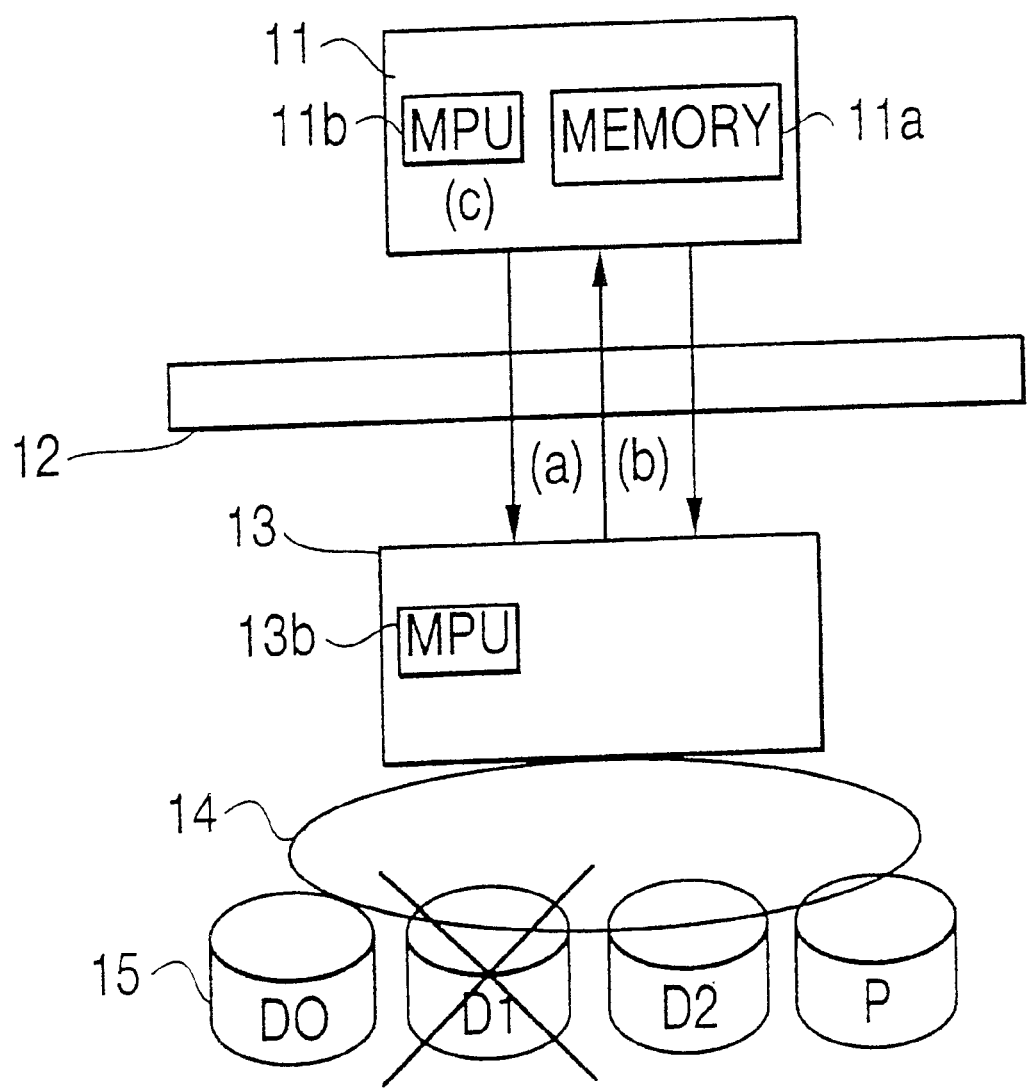
FIG. 7 is a diagram showing the write operation when there is a problem with one of the disk drives in a disk drive group.

FIG. 7 shows the type of operation 900 executed when there is a problem with one of the disk drives in the disk drive group. The operation 900 shown in FIG. 7 is explained with reference to the disk array device 400 shown in FIG. 2.

When there is a problem with one of the disk drives in the disk drive group 15 (for instance, disk D1 as shown in FIG. 7), the device control module 13 sends out a failure complete notice to the subsystem control module 11 in response to read/write or other disk access system commands from the subsystem control module 11. (See (a) in FIG. 7.)

After receiving the notice, the subsystem control module 11 determines that the operation cannot be continued due to disk failure based on the content, the subsystem control module 11 modifies internal configuration modification information (that is, the subsystem control module 11 changes the RAID state to a degeneration state) (See (b) in FIG. 7) and issues a command to separate the disk drive and shift to degeneration mode (See (c) in FIG. 7).

Figure 8:
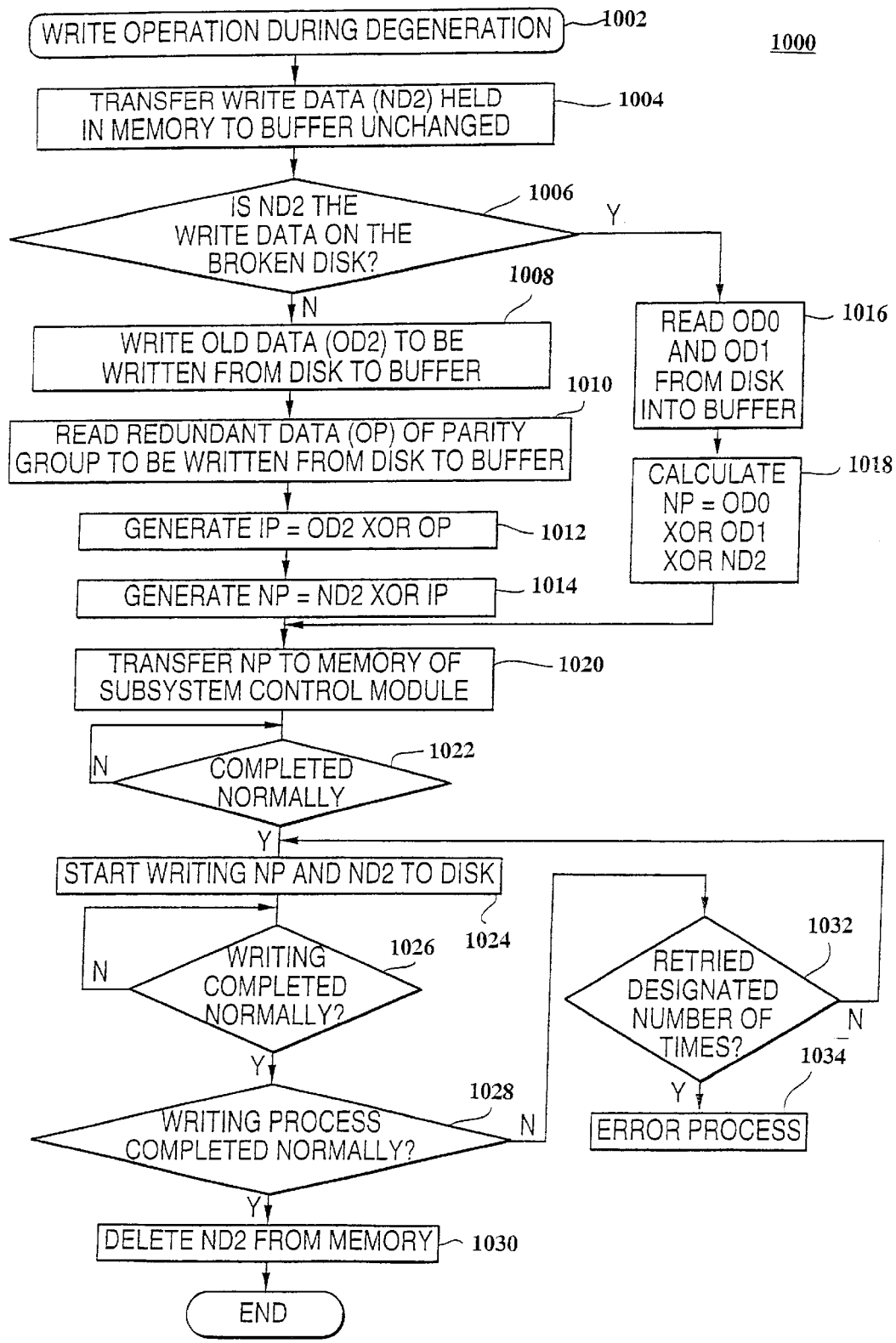
FIG. 8 is a flowchart showing the write operation during degeneration mode.

The write operation in response to the RAID in this degeneration mode 1002 is described using the flowchart 1000 in FIG. 8.

Referring now to FIG. 8, with the write data ND2 held without change in the memory 11a of the subsystem control module 11, the write data ND2 is transferred to the buffer 13a of the device control module 13 (Process 1004). Next, it looks to see if ND2 is the write data on the disk that failed (Process 1006), and if it is not the write data on the broken disk, the old data (data to be updated) OD2 that is to be written is read into the buffer 13a from the disk 15 (Process 1008). Next the redundant data to be updated (OP) is read in to the buffer 13a from the disk 15 (Process 1010).

Next, the old data OD2 and the redundant data to be updated OP are used to create an exclusive "or" (XOR) as the IP (Process 1012). The exclusive "or" (XOR) created with the write data ND2 and the IP serves as the NP (Process 1014).

If ND2 is write data on the broken disk, the data OD0 and OD1 of the redundant same-group for the data OD2 to be updated will be read from the disk 15 (Process 1016), an exclusive "or" will be sought with OD0, OD1 and the write data ND2 which will be used as the new parity (NP) (Process 1018).

Once the new parity NP has been created as described above, NP is transferred to the memory 11a of the subsystem control module 11 (Process 1020).

Next, the subsystem control module 11 waits until the process completes itself normally and then begins writing the write data ND2 and the new parity NP to the disk 15 (Processes 1022 and 1024).

Then, the subsystem control module 11 waits until the writing process has been completed (Process 1026). Once the writing process has been completed normally, the ND2 on the memory 11a will be deleted and the process will be completed (Processes 1028, 1030).

If the writing process is not completed normally, the subsystem control module 11 moves from process 1028 to process 1032 to determine whether a designated number of retries has been reached. If the designated number has not been reached, the subsystem control module 11 returns to process 1024 and retries the writing process beginning with process 1024. If the prescribed number of retries has been reached and the writing process does not end normally, the subsystem control module 11 runs an error process (Process 1034).

As described above, when a disk has degenerated, the newly created redundant data NP is transferred to the memory 11a of the subsystem control module 11 and held (the aforementioned "Mode 2" operation).

Figure 9:
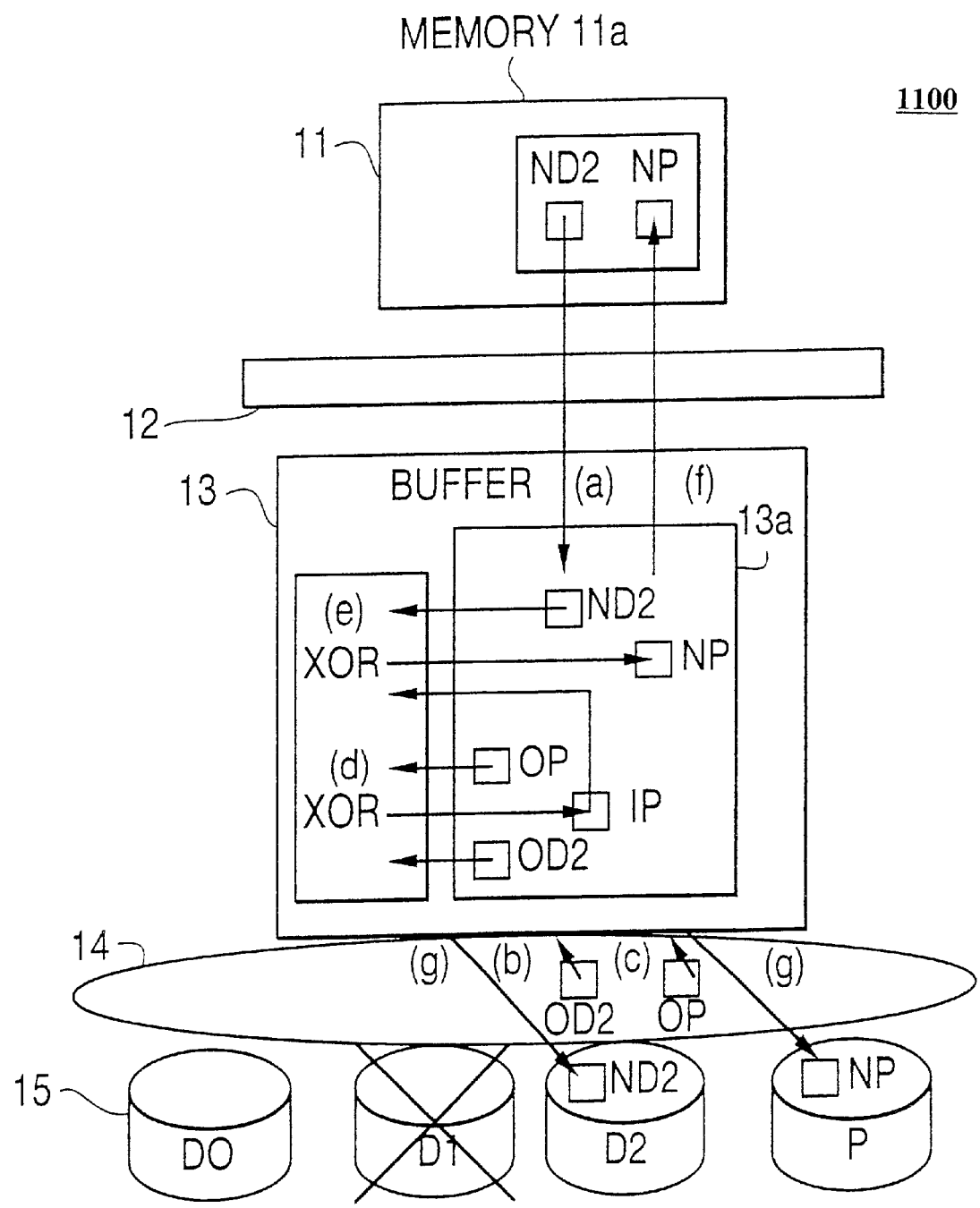
FIG. 9 is a diagram showing a sample write operation sequence in degeneration mode.

FIG. 9 shows an operation sequence example 1100 in which the aforementioned write data ND2 is not the write data on the broken disk.

Referring now to FIG. 9, before the subsystem control module 11 instructs the device control module 13 to perform a write operation, the subsystem control module 11 checks the state of the RAID (such as disk drive group 15) in question. In this case, the state of the RAID that is to be written is taken to be degenerated so the subsystem control module 11 issues write instructions to the device control module 13 as follows:

(a) The write data ND2 is held without change in the memory 11a and transferred from the memory 11a to the buffer 13a.

(b) The old data OD2 that is on the disk to be written to is read out to the buffer 13a.

(c) The redundant data OP of the redundant group belonging to the portion that is to be written is read out to the buffer 13a.

(d) The interim redundant data IP is generated by performing an XOR operation on OD2 and OP.

(e) The new redundant data NP is generated by performing an XOR operation on ND2 and IP.

(f) The NP is written to the memory 11a of the subsystem control module 11.

(g) The ND2 and NP are written to disk 15 and the ND2 in memory 11a is deleted.

Figure 10:
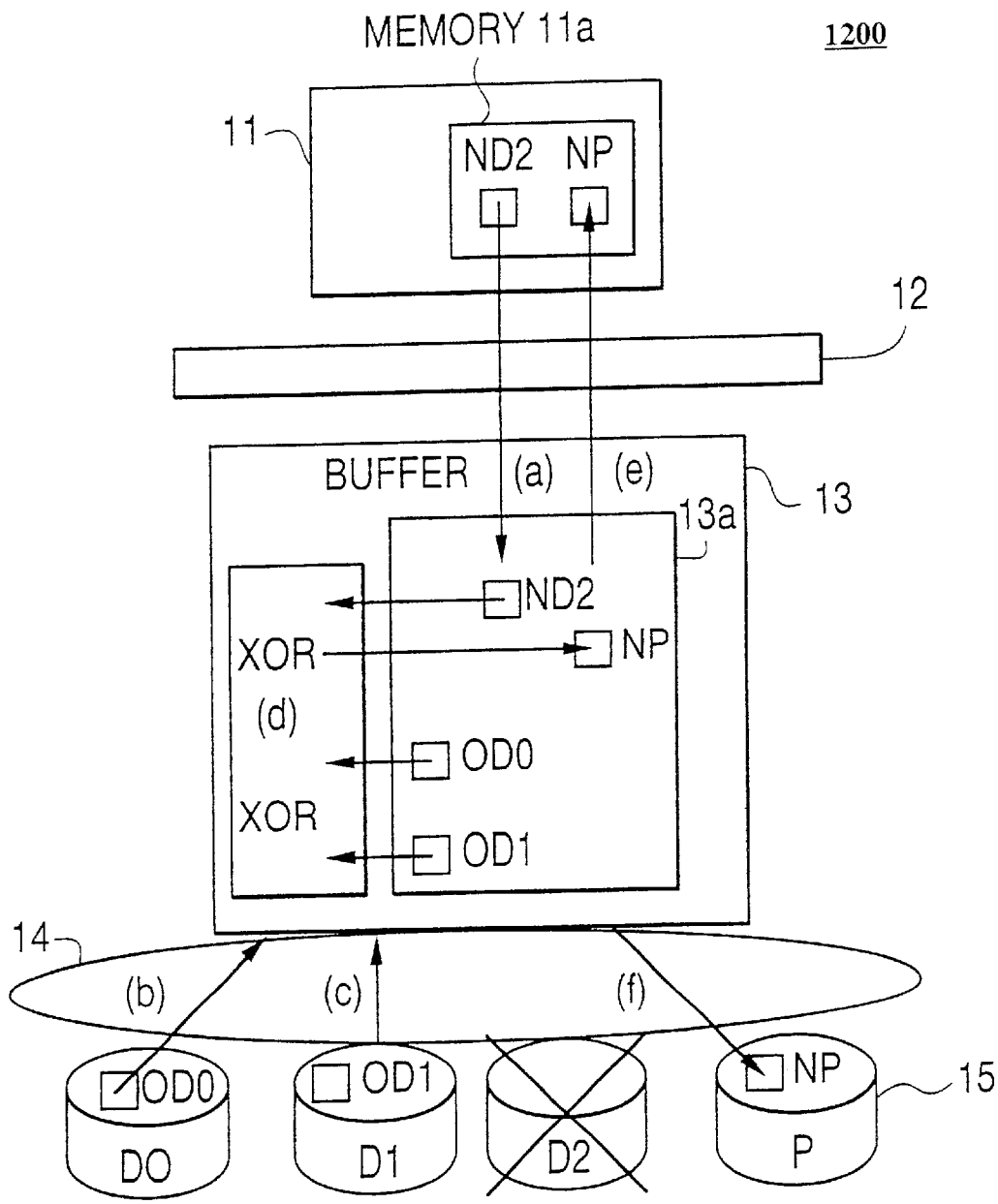
FIG. 10 is a diagram showing another sample write operation sequence in degeneration mode.

FIG. 10 shows an example 1200 of the operating sequence when the aforementioned write data ND2 is the write data on the broken disk.

(a) The write data ND2 is held without change in the memory 11a and transferred from the memory 11a to the buffer 13a.

(b), (c) Without reading OD2 and OP from the disk, the old data OD0 and OD1 on the other disks in the redundant group are read to the buffer 13a.

(d) By performing an XOR operation on OD0, OD1 and ND2, the new redundant data NP is generated. (The creation of the interim redundant data IP is omitted from FIG. 10. In the same way, the IP creation is also omitted from the descriptions below.)

(e) NP is written into the memory 11a of the subsystem control module 11.

(f) ND2 and NP are written to the disk 15 in question and the ND2 in the memory 11a is deleted.

(3) Operation During Recovery After a Power Failure

Next, the case of a momentary, unanticipated power interruption during the write operation is explained. In "Mode 1" (Normal Mode) above, when the power is interrupted unexpectedly during a write operation and only the power supply of the memory 11a in the subsystem control module 11 was available for backup, the write operation to the object disk in the disk drive group 15 was interrupted.

That is, if, after determining whether the response from the device control module 13 was normal in response to the write command, the subsystem control module 11 recognizes a device power interruption without a normal response and determines that the write process is underway and will stop writing to the object disk.

After that, when the power supply is turned back on, if there is unwritten data in the memory 11a, the subsystem control module 11 will try writing again.

Even if the disk is not in a state of degeneration (normal state), if the subsystem control module 11 attempts to write again in "Mode 1" (Normal Mode) there is a possibility that the old data OD (data to be updated) that was read will not be correct since the write was interrupted before the power supply problem, and, therefore, the data would be unusable.

Therefore, when there is unwritten data when the power supply is turned on, the subsystem control module 11 issues an instruction to the device control module 13 to write in the aforementioned "Mode 3".

If the disk is in a state of degeneration, that write process will be performed in "Mode 2". During a "Mode 2" write process, when there has been an unanticipated power supply interruption and only the power supply of the subsystem control module 11 is to have been backed up, then the writing process to the disk in the disk drive group 15 described above would be interrupted.

Afterward, when the power supply had been turned on again, if there is unwritten data in the memory 11a, the subsystem control module 11 would try rewriting the unwritten data. However, if the subsystem control module 11 were to rewrite the data in "Mode 2" at this point, it is possible that the data to be updated (old data) OD had been read incorrectly because the earlier writing process was interrupted and, thus, it would be impossible to use it.

Further, when retrying the write process using the aforementioned "Mode 3", the RAID would already be in a state of degeneration so a parity could not be generated.

However, if the writing before the power interruption was done in the aforementioned "Mode 2", there would be unwritten new redundant data NP held in memory 11a. That means that if there were unwritten data in the memory 11a and unwritten NP when the power supply was turned on, the subsystem control module 11 would issue instructions to device control module 13 to write using "Mode 4" above.

Figure 11:
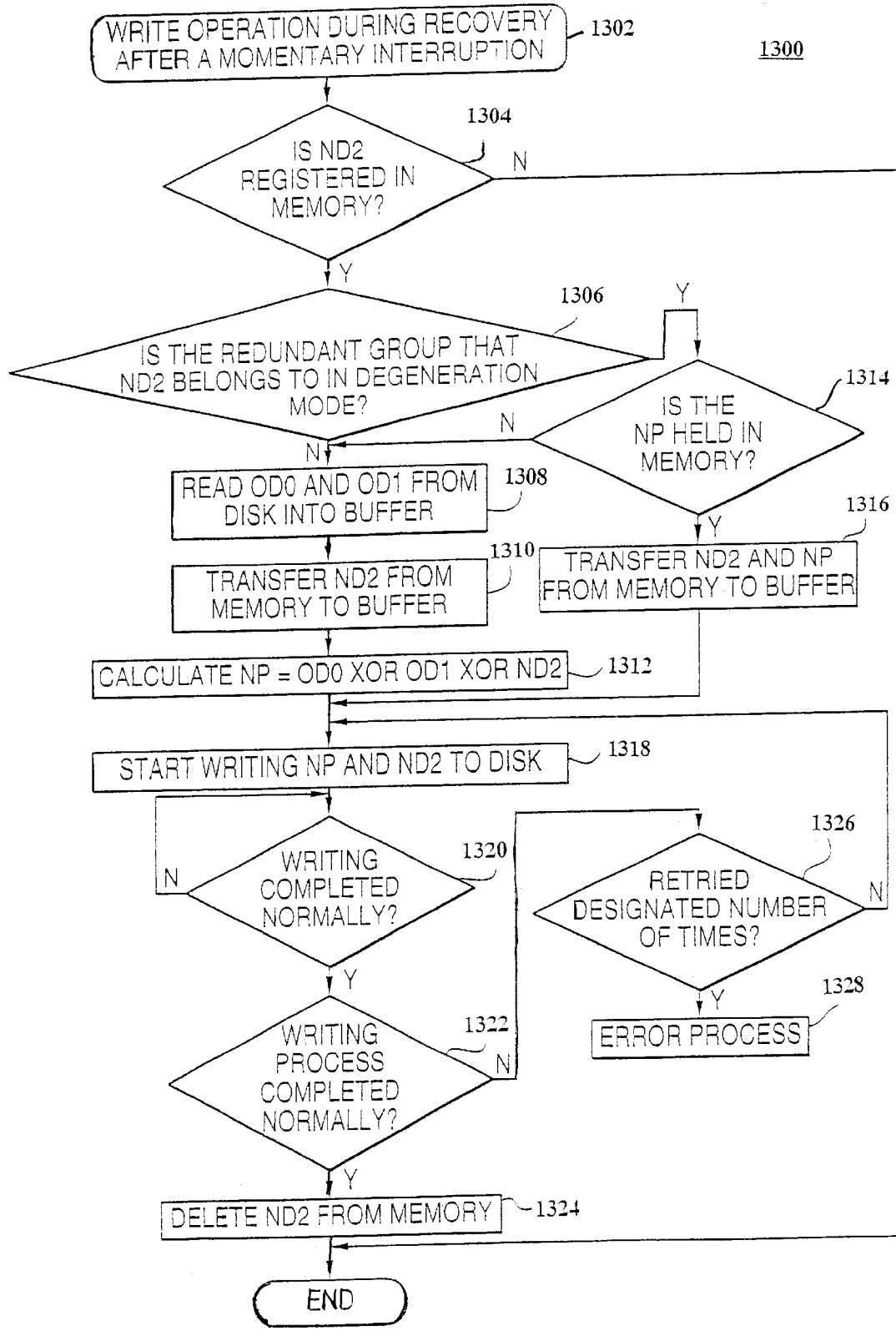
FIG. 11 is a flowchart showing the write operation during recovery after a power supply interruption.

The flowchart 1300 shown in FIG. 11 is used to describe the writing process during a restoration after the aforementioned power supply interruption, 1302.

During the recovery after a momentary power supply interruption, the subsystem control module 11 checks to see if the write data ND2 stored in the memory 11a is registered or not (Process 1304). If the write data ND2 isn't registered, the process is ended. If the write data ND2 is registered, the subsystem control module 11 checks to see if the redundant data belonging to the ND2 is in degeneration mode (Process 1306).

If the redundant data belonging to ND2 is not in degeneration mode, the data to be updated OD2 that is to be written and the data from the same redundant data OD0 and OD1 are read from the disk drive group 15 into the buffer 13a (Process 1308). The write data ND2 is transferred from the memory 11a into the buffer 13a (Process 1310).

Next, an exclusive "or" (XOR) operation is performed on the aforementioned OD0, OD1 and the write data ND2 as the new redundant data NP (Process 1312).

At the same time, for Process 1314 in degeneration mode, the subsystem control module 11 checks to see if the new redundant data NP is held in the memory 11a. If the new redundant data NP is held in the memory 11a, the write data ND2 and NP are transferred to the buffer 13a. If the new redundant data NP is not held in memory 11a, control is returned to Process 1308.

Next, the writing of the write data ND2 and the New Parity NP to the disk 15 begins (Process 1318).

The subsystem control module 11 then waits until the writing process is complete (Process 1320). If the writing process ends normally, the ND2 is deleted from the memory 11a and the process is concluded (Processes 1322 and 1324).

If the writing process does not end normally, the subsystem control module 11 goes from Process 1322 to Process 1326 and checks to see if the designated number of retries has been reached. If the designated number has not been reached, the subsystem control module 11 returns to Process 1318 and tries writing again. Then, if the writing still does not end normally after reaching the designated number of times, the subsystem control module 11 executes an error process (Process 1328).

Figure 12:
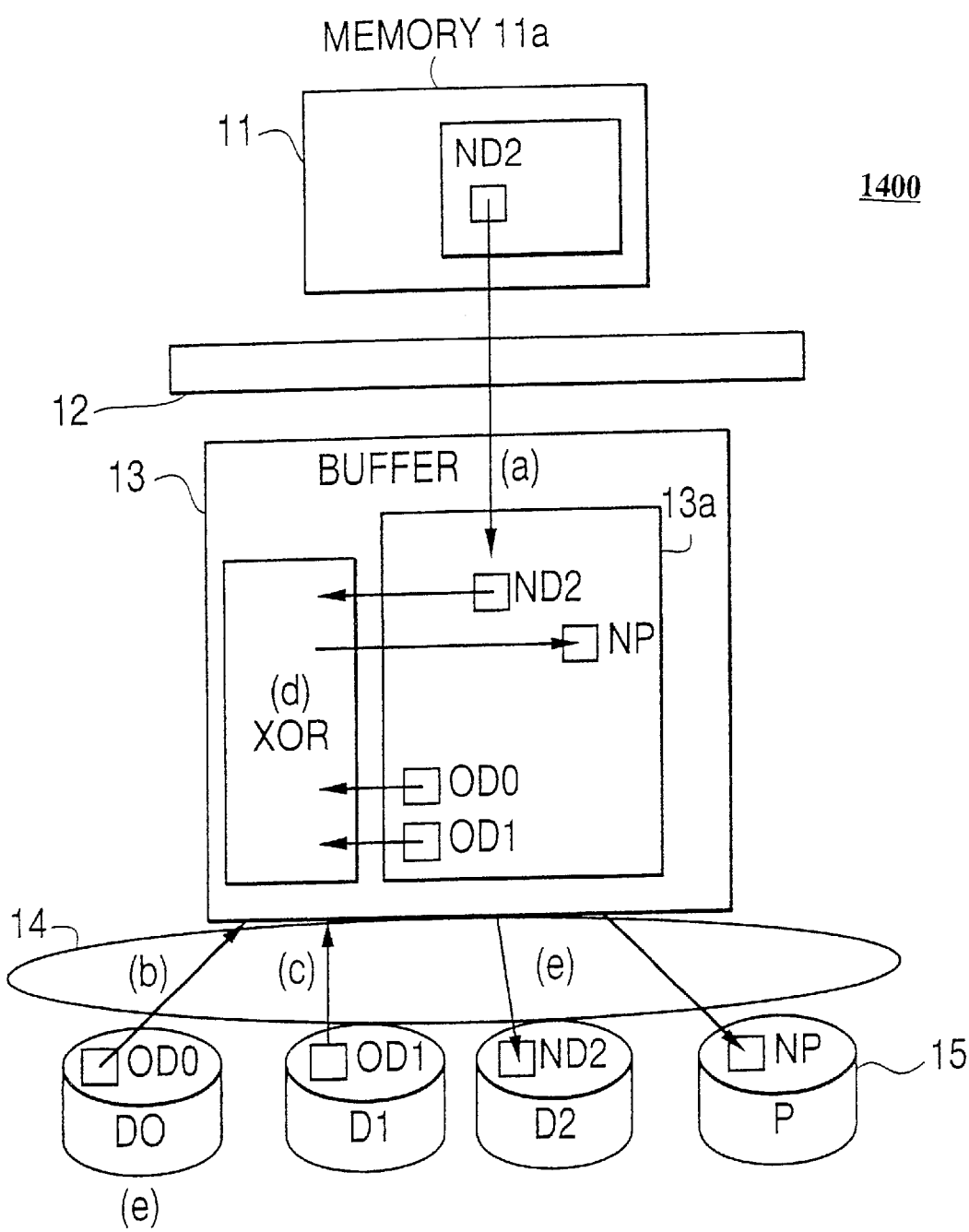
FIG. 12 is a diagram showing a typical write operation sequence during recovery after a power supply interruption (not degeneration mode).

FIG. 12 shows an example 1400 of the write operating sequence during recovery after a temporary power supply interruption when not in a degeneration state.

(a) The write data ND2 is transferred from the memory 11a to the buffer module 13a.

(b), (c) The OD2 in the redundant group and the data OD0 and OD1 from the redundant same-group at the same address are read into the buffer module 13a.

(d) An XOR operation is performed on the above identical redundant group data OD0, OD1 and ND2 and the new redundant data NP is created.

(e) ND2 and NP are written to the disk drive group 15.

Figure 13:
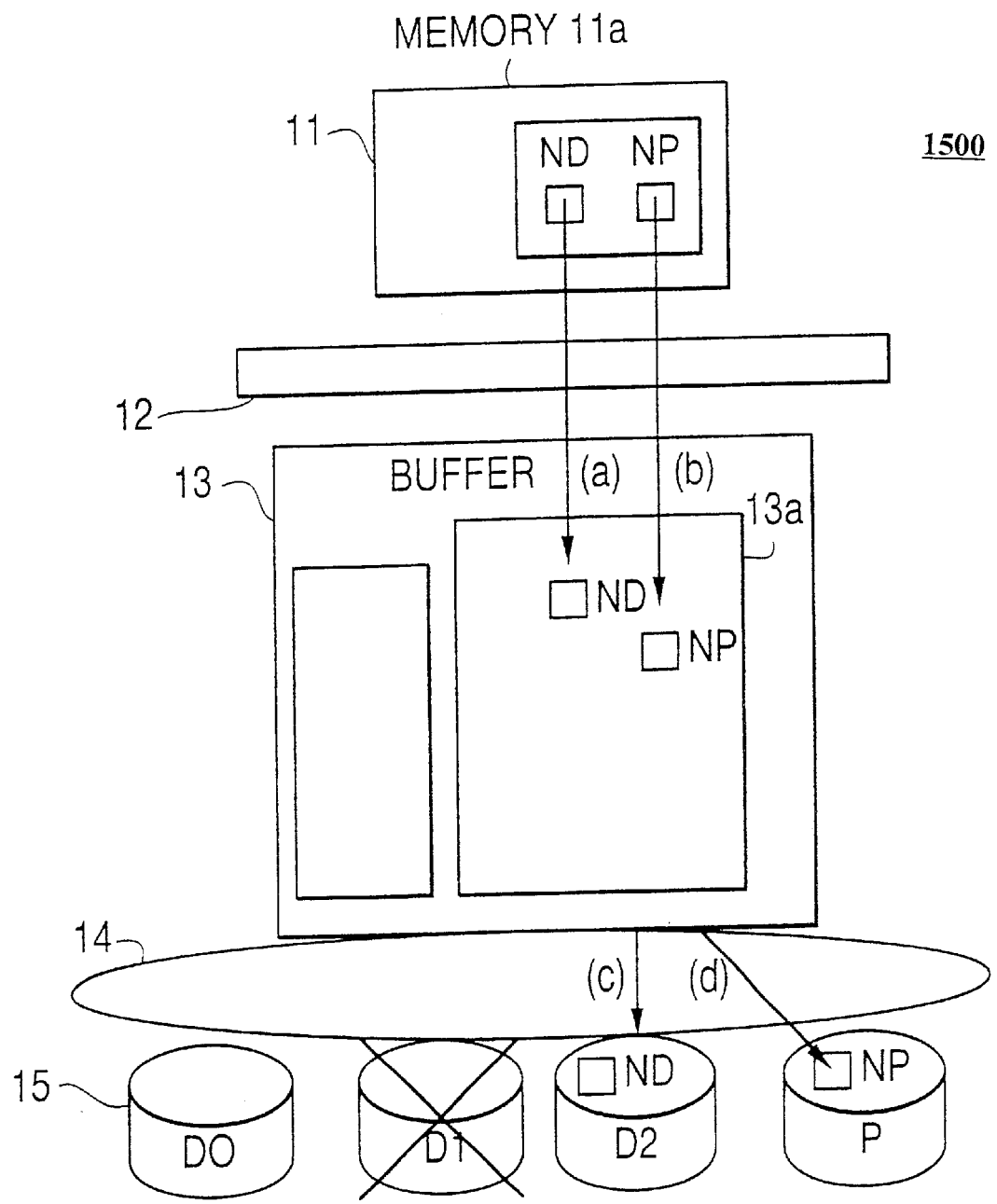
FIG. 13 is a diagram showing a typical write operation sequence during recovery after a power supply interruption (degeneration mode)
Figure 14A:
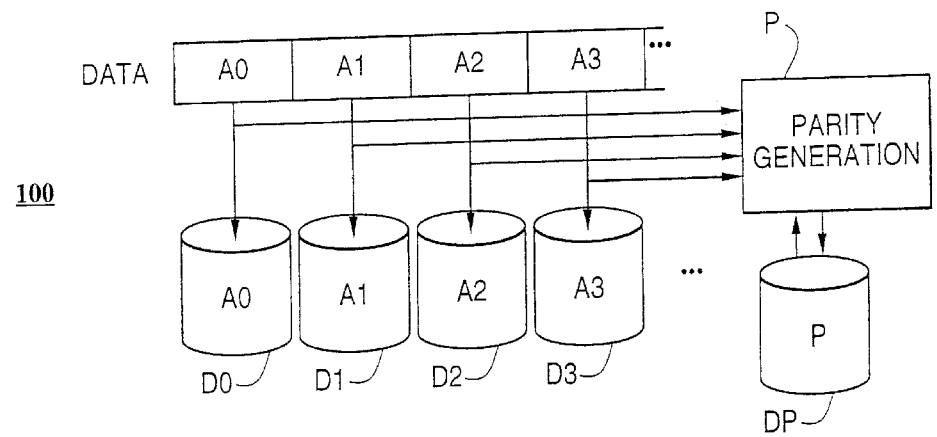
FIGS. 14(a) and 14(b) are diagrams of the related art explaining RAID 4 and RAID 5.
Figure 14B:
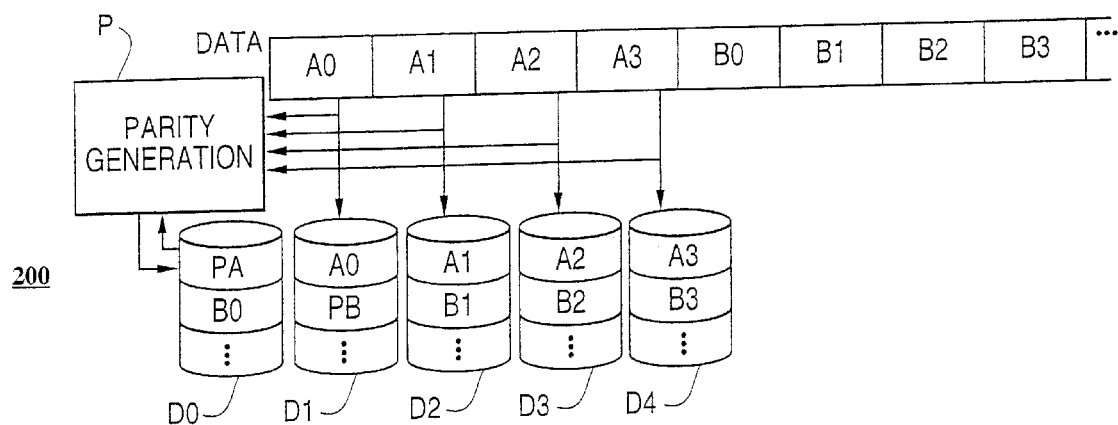

FIG. 13 shows an example 1500 of a write operation sequence during recovery after a momentary power supply interruption in degeneration mode.

(a) The write data ND is transferred from the memory 11a into the buffer module 13a.

(b) NP is transferred from the memory 11a into the buffer module 13a.

(c) ND is written to the disk drive group 15.

(d) NP is written to the disk drive group 15.

Effect of the Invention

As described above, by using the present invention in disk array devices in which RAID 4 and RAID 5 are used, the following effects are realized:

(1) In degeneration mode, the disk array device was set up to transfer the redundant data into a memory backed up with a power supply, so compared with conventional examples in which the redundant data was transferred into memory constantly, degraded performance can be limited to a minimum and a high degree of reliability can be maintained.

(2) In degeneration mode, using the redundant data in the memory during the writing operation when the system power supply has been turned back on after it has been interrupted allows the data to be written correctly irrespective of whether the redundant data was in the middle of being written or not.

(3) By generating new redundant data from the same group data on other disks within a RAID group and the write data in memory, correct redundant data is created during degeneration without regard to whether the disk data was in the middle of being written or not.

In particular, when the power supply is turned back on after a system power supply interruption when the disks are normal, by generating new redundant data from the same group data from the other disks within the RAID group and the write data in memory, it is possible to write correctly even when the data on the disk is incorrect or is unreliable.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Element Number List

1 Subsystem Control Module
1a Memory
1b Battery
2 Device Control Module
3 Disk Drive Group
4 Redundant Data Generation
11 Subsystem Control Module
11a Memory
11b MPU
12 Internal Subsystem Interface
13 Device Control Module 13a Buffer
13b MPU
13c XOR
14 Device Interface Module
15 Disk Drive Group
100 RAID 4 System
200 RAID 5 System
300 Disk Array Device Control Unit
400 Disk Array Device
500 Small-scale Disk Array Subsystem
600 Disk Array Device
602 Upper Device
604 Channel Interface Module
606 bus

What is claimed is:

1. A disk array device comprising:
    a subsystem control module comprising a memory backed up with a battery;
    disks; and
    a device control module controlling said disks and comprising a buffer storing redundant data, wherein when data is to be written to said disks, the disk array device allocates and writes the data to the respective disks, generates redundant data from said allocated data and corresponding to said allocated data, and writes said redundant data onto disks of said disks not storing the corresponding allocated data, and wherein when writing data to said disks, the data written to the memory of said subsystem control module is held until a writing process is completed and when at least one of said disks is broken or degenerated, the disk array device transfers and stores the redundant data stored in the buffer of the device control module to the memory of the subsystem control module, wherein the subsystem control module instructs the device control module to be in a first mode if the disks are in a normal state, a second mode if at least one of the disks is in a degeneration state, a third mode upon restoration of power after an unexpected loss of power while writing and the at least one of the disks is not in a degeneration state, and a fourth mode upon restoration of power after an unexpected loss of power while writing and the at least one of the disks is in a degeneration state.

2. The disk array device as in claim 1, wherein said disk array device generates the corresponding redundant data from data written to one of the disks and from redundant same-group data stored on normally operating disks and sends said redundant data to the memory of said subsystem control module when data is to be written to one of the disks but the one of the disks is broken and when said one of the disks is degenerated.

3. The disk array device as in claim 2, further comprising a power supply, wherein said disk array device performs write operations using the corresponding redundant data held in the memory of the subsystem control module when the power supply is turned on.

4. The disk array device as in claim 3, wherein the disk array device performs the write operations when there is unwritten data stored in the memory of the subsystem control module when the power supply is turned back on.

5. The disk array device as in claim 1, further comprising a power supply, wherein said disk array device performs write operations using the corresponding redundant data held in the memory of the subsystem control module when the power supply is turned on.

6. The disk array device as in claim 2, further comprising a power supply, wherein said disk array device generates redundant data using the redundant same-group data stored in another of the disks other than the one of the disks to be written to when the power supply is turned on.

7. The disk array device as in claim 6, wherein the disk array device performs the write operations when there is unwritten data stored in the memory of the subsystem control module when the power supply is turned back on.

8. The disk array device as in claim 1, further comprising a power supply, wherein said disk array device generates the corresponding redundant data using the redundant same-group data stored in another of the disks other than the one of the disks to be written to when the power supply is turned on.

9. A method of a disk array device controlling disks storing data and coupled to a host computer, said method comprising:
    storing data redundant to data received from the host computer, in a memory, having a backup power supply comprising a battery, of the disk array device until the data received from the host computer is successfully written to the disks by the disk array device; and
    instructing, by a subsystem control module of the disk array device, a device control module of the disk array device, to be in a first mode if the disks are in a normal state, a second mode if at least one of the disks is in a degeneration state, a third mode upon restoration of power after an unexpected loss of power while writing and the at least one of the disks is not in a degeneration state, and a fourth mode upon restoration of power after an unexpected loss of power while writing and the at least one of the disks is in a degeneration state.

10. The method as in claim 9, wherein the redundant data stored in the memory is written to the disks in place of the data received from the host computer if power to the disk array device is lost before the data received from the host computer is successfully written to the disks.

11. The method as in claim 9, further comprising:
    writing data to the disk in the first mode if the disk is operating normally and writing the data to the disk in the second mode if the disk is in the degeneration state.

12. The method as in claim 11, further comprising writing data including the redundant data to the disk in the third mode if the disk array device encountered an unexpected loss of power and the disk is operating normally, and writing data including the redundant data to the disk in the fourth mode if the disk array device encountered an unexpected loss of power and the disk is in the degeneration state.

13. The method as in claim 12, wherein the disk array device accesses disks storing data in a RAID 4 configuration.

14. The method as in claim 12, wherein the disk array device accesses disks storing data in a RAID 5 configuration.

15. The method as in claim 12, wherein the data including the redundant data is determined based upon redundant data generation in a device control module of the disk array device.

16. A disk array device coupled to and receiving data from a host computer, said disk array device comprising:
    a subsystem control module comprising a memory having a backup power supply comprising a battery, said memory storing data redundant to the data received from the host computer; and
    a device control module in communication with the subsystem control module, said device control module interfacing to and controlling access of a disk drive group storing data and parity on disk drives, wherein said memory of said subsystem control module stores the redundant data until the device control module notifies the subsystem control module that the device control module has successfully written the data received from the host computer to the disk drive group, wherein the subsystem control module instructs the device control module to be in a first mode if the disks are in a normal state, a second mode if at least one of the disks is in a degeneration state, a third mode upon restoration of power after an unexpected loss of power while writing and the at least one of the disks is not in a degeneration state, and a fourth mode upon restoration of power after an unexpected loss of power while writing and the at least one of the disks is in a degeneration state.

17. The disk array device as in claim 16, wherein the subsystem control module controls the device control module to write the data to one of the disks provided in the disk device group in the first mode if one of the disks is operating normally and to write the data to the one of the disks in the second mode if the one of the disks is in the degeneration state.

18. The disk array device as in claim 17, wherein the subsystem control module controls the device control module to write data including the redundant data to the disk in the third mode if the disk array device encountered an unexpected loss of power and the one of the disks is operating normally, and to write data including the redundant data to the one of the disks in the fourth mode if the disk array device encountered an unexpected loss of power and the one of the disks is in the degeneration state.

19. The disk array device in claim 18, wherein the disk array device accesses disks storing data in a RAID 4 configuration.

20. The disk array device as in claim 18, wherein the disk array device accesses disks storing data in a RAID 5 configuration.

21. The disk array device as in claim 18, wherein the data including the redundant data is determined based upon redundant data generation in the device control module.

* * * * *

UNITED STATES PATENT AND TRADEMARK OFFICE
CERTIFICATE OF CORRECTION

PATENT NO. : 6,816,981 B2
DATED : November 9, 2004
INVENTOR(S) : Hirofumi Morita et al.

It is certified that error appears in the above-identified patent and that said Letters Patent is hereby corrected as shown below:

Title page,
Item [75], Inventors, change "Takashi Ishida, Yokohama" to -- Takashi Ishida, Kawasaki --;
Item [56], References Cited, U.S. PATENT DOCUMENTS, insert the following omitted references:
-- 5,954,822    9/1999  Yashiro et al.
5,787,400    7/1998  Weber --
FOREIGN PATENT DOCUMENTS, insert the following omitted references:
-- JP    11143649    5/1999
JP    06119126    4/1994 --
OTHER PUBLICATIONS, insert:
-- U.S. Serial No.: 09/065,780  Filed: 4/23/1998  Suijin TAKETA et al.  Assignee: Fujitsu Limited --

Signed and Sealed this

Twenty-first Day of June, 2005

JON W. DUDAS
*Director of the United States Patent and Trademark Office*